United States Patent [19]
Kawano et al.

[11] Patent Number: 5,523,856
[45] Date of Patent: Jun. 4, 1996

[54] SYNCHRONIZING SIGNAL DETECTING AND ERROR-CORRECTING APPARATUS

[75] Inventors: Masaki Kawano; Takahito Seki, both of Kanagawa; Chihoko Takizawa, Tokyo, all of Japan

[73] Assignee: Sony Corporation, Tokyo, Japan

[21] Appl. No.: 155,291

[22] Filed: Nov. 22, 1993

[30] Foreign Application Priority Data

Nov. 25, 1992 [JP] Japan .................................. 4-338035

[51] Int. Cl.$^6$ .............................. H04N 5/94; G11B 5/09
[52] U.S. Cl. ................. 358/336; 360/37.1; 360/38.1; 360/53; 369/48; 358/314; 358/319; 371/31
[58] Field of Search .................... 358/335, 310, 358/319, 314, 336; 348/500, 501, 521, 524, 525, 533, 616; 360/37.1, 38.1, 51, 53; 369/47, 48, 54, 58, 124; 371/30, 31, 42, 46; H04N 5/76, 5/78, 5/781, 5/782, 5/783, 5/04, 5/06, 5/08, 9/80, 9/88, 5/92, 5/94

[56] References Cited

U.S. PATENT DOCUMENTS

| | | | |
|---|---|---|---|
| 4,024,571 | 5/1977 | Dischert et al. | 358/319 |
| 4,407,627 | 10/1983 | Eto et al. | 358/336 |
| 4,418,364 | 11/1983 | Wine | 358/336 |
| 4,428,003 | 1/1984 | Sugiyama et al. | 358/336 |
| 4,639,792 | 1/1987 | Moxon | 358/336 |
| 4,663,752 | 5/1987 | Kakuse et al. | 358/336 |
| 4,769,704 | 9/1988 | Hirai et al. | 358/319 |
| 5,134,607 | 7/1992 | Fuji et al. | 369/124 |
| 5,136,564 | 8/1992 | Tobita | 369/32 |
| 5,229,893 | 7/1993 | Dworatzek et al. | 358/336 |

FOREIGN PATENT DOCUMENTS

| | | |
|---|---|---|
| 0052432 | 5/1982 | European Pat. Off. . |
| 0096854 | 12/1983 | European Pat. Off. . |
| 0236017 | 9/1987 | European Pat. Off. . |
| 0254386 | 1/1988 | European Pat. Off. . |
| 0443376 | 8/1991 | European Pat. Off. . |
| 0453876 | 10/1991 | European Pat. Off. . |

OTHER PUBLICATIONS

Patent Abstracts of Japan vol. 16, No. 401 (E-1253) 25 Aug. 1992 & JP-A-04 132 431 (Canon Inc) 6 May 1992.
Patent Abstracts of Japan vol. 16, No. 404 (P-1410) 26 Aug. 1992 & JP-A-04 134 670 (Olympus Optical Co Ltd) 8 May 1992.

*Primary Examiner*—Thai Q. Tran
*Attorney, Agent, or Firm*—William S. Frommer; Alvin Sinderbrand

[57] ABSTRACT

A synchronizing signal extracting apparatus comprising synchronizing signal detecting circuit for detecting a synchronizing signal of predetermined bits from entered digital data, synchronizing signal generating circuit adapted to be reset by an output of the synchronizing signal detecting circuit, the synchronizing signal generating circuit generating an output in a timing of said synchronizing signal, and synchronizing signal extracting circuit for outputting, as a synchronizing signal, a result of an OR operation performed on the output of said synchronizing signal detecting circuit and the output of said synchronizing signal generating circuit, the synchronizing signal extracting circuit changing a state thereof according to match/mismatch in timing between the output of said synchronizing signal detecting circuit and the output of said synchronizing signal generating circuit. The novel setup outputs correct synchronizing signals and data enable signal even if the detection of synchronizing signals is missed or erroneously made, reduces chances of the missed detection of synchronizing signals even when the signal-to-noise ratio of reproduced signal is poor at digital VTR variable-speed reproduction or high-speed search, and implements synchronizing signal extraction of high precision.

8 Claims, 5 Drawing Sheets

F I G. 2
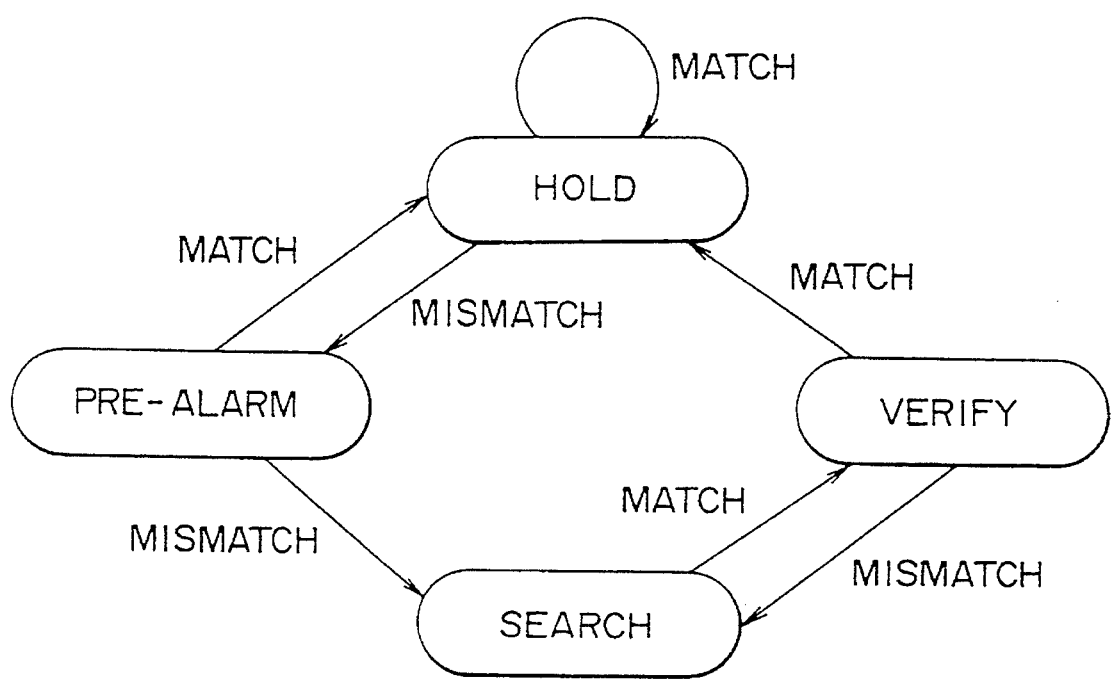

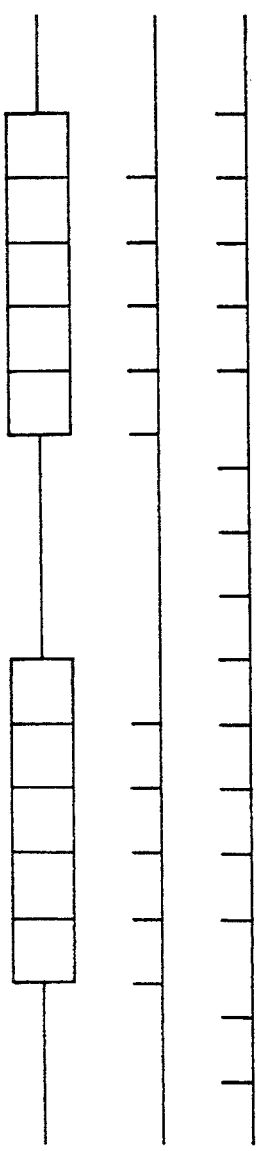
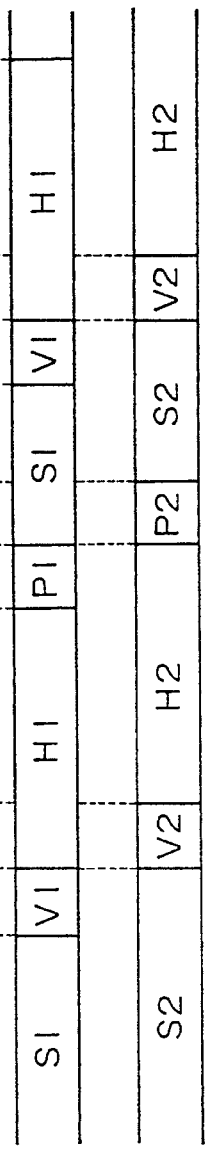
FIG. 3(a) INPUT DATA
FIG. 3(b) SYNC 1
FIG. 3(c) SYNC 2
FIG. 3(d) STATE
FIG. 3(e) SYNC 3
FIG. 3(f) STATE 1
FIG. 3(g) STATE 2
FIG. 3(h) D-EN
FIG. 3(i) OUTPUT DATA

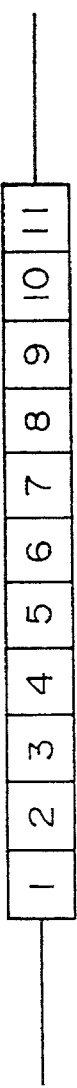
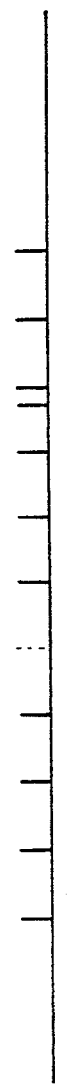
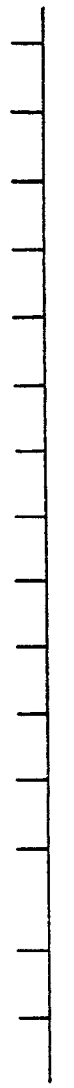
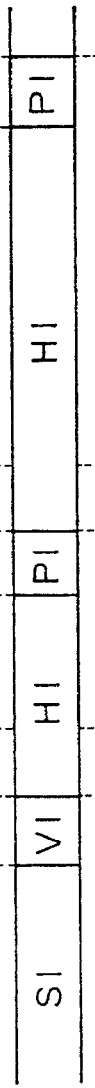
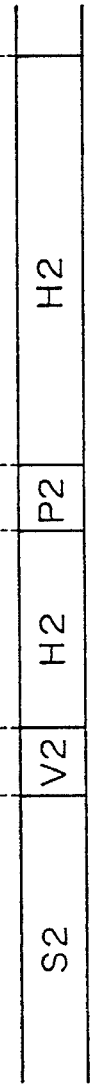
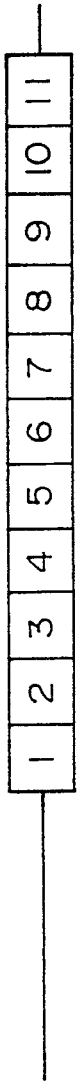
FIG. 4(a) INPUT DATA
FIG. 4(b) SYNC 1
FIG. 4(c) SYNC 2
FIG. 4(d) STATE
FIG. 4(e) SYNC 3
FIG. 4(f) STATE 1
FIG. 4(g) STATE 2
FIG. 4(h) D-EN
FIG. 4(i) OUTPUT DATA

SYNCHRONIZING SIGNAL DETECTING AND ERROR-CORRECTING APPARATUS

BACKGROUND OF THE INVENTION

1. Field of the Invention

The present invention relates to a synchronizing signal extracting apparatus for use in a digital signal recording/reproducing apparatus and the like.

2. Description of the Related Art

A digital audio tape recorder (DAT) and a digital video tape recorder (digital VTR) are known as digital signal recording/reproducing apparatuses. In these digital signal recording/reproducing apparatuses, a digitized video signal or audio signal is added with a synchronizing signal, an identification code, and an error correction code at each predetermined interval to form a sync block before being recorded. At reproduction, the synchronizing signal is detected to determine a head of the sync block to perform such processing as error correction and digital/analog conversion.

In the DAT, the synchronizing signal is extracted only by means of matching patterns of one byte constituting the synchronizing signal and checking a simple parity.

However, the above-mentioned method in which the synchronizing signal is extracted only by pattern matching and simple-parity checking is unable to extract a correct synchronizing signal when missed detection or erroneous detection occurs.

OBJECTS AND SUMMARY OF THE INVENTION

It is therefore an object of the present invention to provide a synchronizing signal extracting apparatus for extracting a correct synchronizing signal even if detection missing or erroneous detection occurs.

It is another object of the present invention to provide a synchronizing signal extracting apparatus which misses detection of a synchronizing signal as rarely as possible even if a signal-to-noise ratio of a reproduced signal is poor in such a situation as digital VTR variable-speed reproduction or high-speed searching.

In carrying out the invention and according to a first aspect thereof, there is provided a synchronizing signal extracting apparatus for extracting a synchronizing signal from data reproduced from a digital VTR, comprising a synchronizing signal detecting circuit (a first circuit) for detecting the synchronizing signal having a predetermined number of bits from input digital data, a synchronizing signal generating circuit (a second circuit) constituted so that it can be reset by the first circuit and generates an output at a period of the synchronizing signal, and a synchronizing signal extracting circuit (a third circuit) which outputs as a synchronizing signal a result of an OR operation performed on the outputs of the first and second circuits and changes its state depending on a timing match or mismatch between the outputs of the first and second circuits.

In carrying out the invention and according to a second aspect thereof, there is provided a synchronizing signal extracting apparatus in which the synchronizing signal extracting circuit outputs a signal for indicating validity of a synchronizing signal based on a state in which the circuit is operating.

In carrying out the invention and according to a third aspect thereof, there is provided a synchronizing signal extracting apparatus in which the number of allowable bits at detection of a synchronizing signal is set according to the state of the synchronizing signal extracting circuit.

In carrying out the invention and according to a fourth aspect thereof, there is provided a synchronizing signal extracting apparatus in which a synchronizing signal consists of two bytes, a detecting circuit (a fourth circuit) for detecting one byte of the synchronizing signal from input digital data is provided, and the two bytes of the synchronizing signal are detected by the synchronizing signal detecting circuit.

According to the first aspect, the synchronizing signal generating circuit generates the output at the period of the synchronizing signal, so that, once the synchronizing signal detecting circuit has reset the synchronizing signal generating circuit upon detection of a synchronizing signal, the synchronizing signal is output from the synchronizing signal extracting circuit even if the synchronizing signal detecting circuit has missed detection of the synchronizing signal or made an erroneous detection thereof.

According to the second aspect, the synchronizing signal extracting circuit outputs the signal for indicating the validity of the synchronizing signal to be output by this circuit according to the state of the circuit. This indicating signal goes high when, for example, the synchronizing signal detecting circuit detects one synchronizing signal and then detects a synchronizing signal in a timing that matches the output of the synchronizing signal generating circuit. This indicating signal goes low when two synchronizing signals are missed consecutively.

According to the third aspect, if the synchronizing signal detecting circuit (the first circuit) detects one synchronizing signal at digital VTR variable-speed reproduction or high-speed search for example and then a synchronizing signal in a timing that matches the output of the synchronizing signal generating circuit, it is assumed that the synchronizing signal has been detected even if the synchronizing signal detecting circuit has not detected a complete match in synchronous pattern.

According to the fourth aspect, the detecting circuit (the fourth circuit) detects one byte of the synchronizing signal and the synchronizing signal detecting circuit (the first circuit) detects two bytes of the synchronizing signal, thereby enhancing synchronizing signal detection accuracy.

BRIEF DESCRIPTION OF THE DRAWINGS

The above and other objects, features and advantages of the present invention will become more apparent from the following description taken in connection with the accompanying drawings, in which:

FIG. 2 is a diagram illustrating a state transition of a state machine in the first embodiment;

FIG. 3 is an operation timing chart provided when the synchronizing signal extracting apparatus practiced as the first embodiment involves no error;

FIG. 4 is an operation timing chart provided when the synchronizing signal extracting apparatus practiced as the first embodiment involving an error.

DESCRIPTION OF THE PREFERRED EMBODIMENTS

This invention will be described in further detail by way of example with reference to the accompanying drawings.

Figure 1:
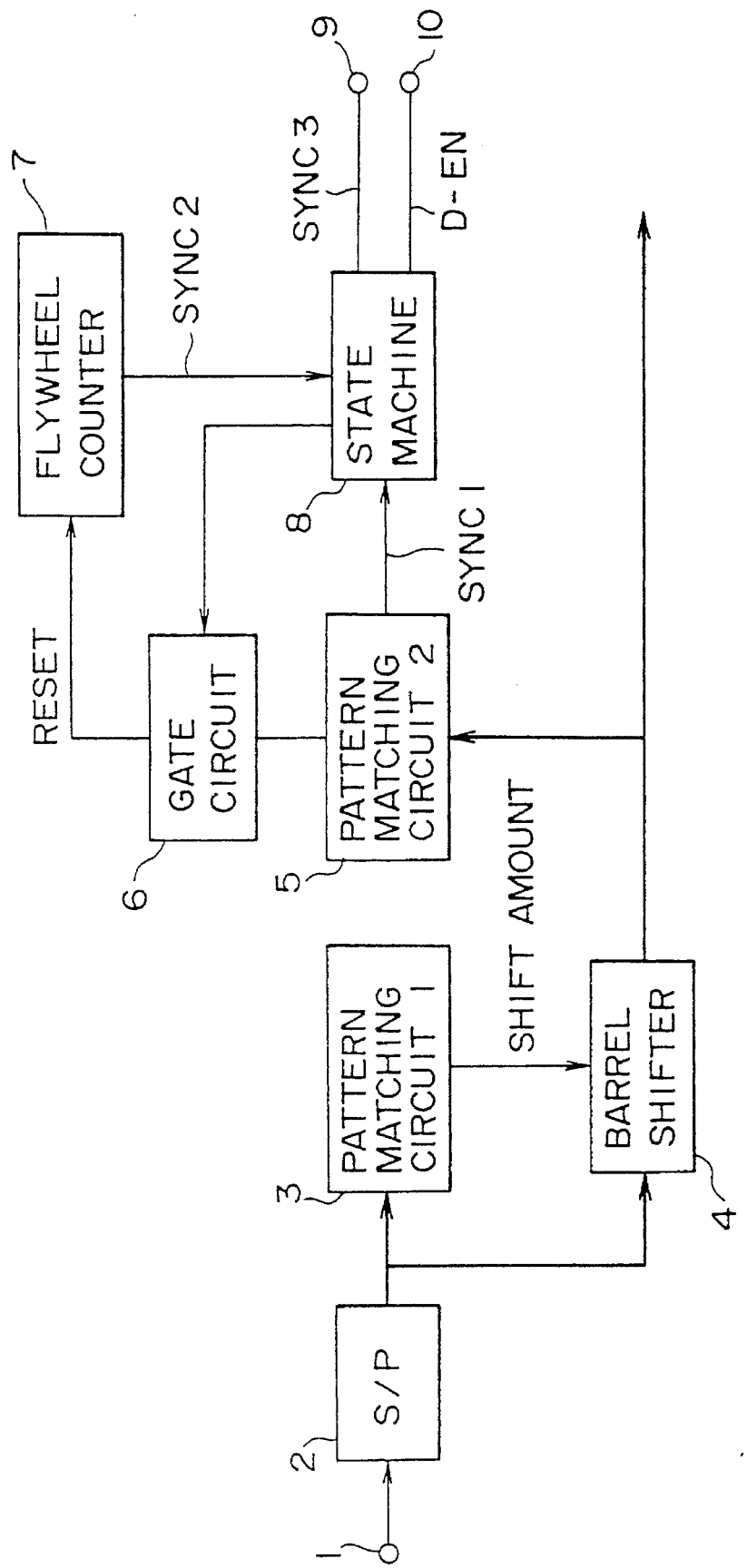
FIG. 1 is a block diagram illustrating a constitution of the synchronizing signal extracting apparatus practiced as a first embodiment of the invention.

FIG. 1 is a block diagram illustrating a constitution of the synchronizing signal extracting apparatus practiced as a first embodiment of the invention.

First, serial data entered at terminal 1 is divided in units of eight bits to be converted by a serial/parallel converting circuit 2 into eight-bit parallel data.

The eight-bit parallel data thus obtained is entered in a first pattern matching circuit 3. The first pattern matching circuit 3 compares a pattern of a first one byte of a two-byte synchronizing signal and seven patterns generated by shifting the pattern of the first byte by one bit with a pattern of the entered eight-bit parallel data to determine by how many bits the first one byte of the synchronizing signal in the entered eight-bit parallel data has been offset in the eight-bit division. The first pattern matching circuit 3 then supplies a control signal corresponding to the offset to a barrel shifter 4 in which the eight-bit parallel signal is shifted to a normal alignment.

The normally aligned parallel data is then entered in a second pattern matching circuit 5. The second pattern matching circuit 5 detects a match between patterns of the two bytes of the synchronizing signal in the entered data. Then the circuit 5 supplies a sync pulse SYNC1 to a state machine 8 in a timing in which the match has been detected. The circuit 5 also supplies a matching flag to a gate circuit 6. The gate circuit 6 opens when the state machine 8 is in search mode to supply the matching flag to a flywheel counter 7 to reset the counter.

The flywheel counter 7 is a counter which operates in a period of one sync block and is reset by the output of the gate circuit 6 as described above. Then the counter 7 outputs a second sync pulse SYNC2.

The state machine 8 performs an OR operation on the second sync pulse SYNC2 outputted from the flywheel counter 7 and the first sync pulse SYNC1 outputted from the pattern matching circuit 5 and outputs an operational result to a terminal 9 as a third sync pulse SYNC3. At the same time, the state machine 8 outputs a D-EN signal (hereinafter referred to as a data enable signal) which indicates validity of the data from a terminal 10. In the search mode, the state machine 8 outputs a control signal for opening the gate circuit 6.

The state machine 8 has four states; search, verify, hold and pre-alarm. FIG. 2 is a state transition diagram indicating an interrelation between these states.

In the search mode, a pattern match is detected by the second pattern matching circuit 5. When the first sync pulse SYNC1 is entered in the state machine 8, the state machine enters the verify mode. If no pattern match is found and the first sync pulse SYNC1 is not entered, the state machine stays in the search mode.

In the verify mode, if the second sync pulse SYNC2 outputted from the flywheel counter 7 and the first sync pulse SYNC1 outputted from the second pattern matching circuit 5 match in timing, the state machine 8 enters the hold mode. If no match is found, the state machine enters the search mode.

In the hold mode, if the second sync pulse SYNC2 and the first sync pulse SYNC1 match in timing, the state machine 8 stays in the hold mode. If no match is found, the state machine shifts to the pre-alarm mode.

In the pre-alarm mode, if the second sync pulse SYNC2 and the first sync pulse SYNC1 match in timing, the state machine 8 enters the hold mode. If no match is found, the state machine shifts to the search mode.

FIG. 3 is a timing chart indicating an operation of the synchronizing signal extracting apparatus practiced as the first embodiment of the invention when no error is involved. FIG. 4 is a timing chart indicating an operation of the above-mentioned apparatus when an error is involved.

Now, referring to FIGS. 1 through 3, the operation without error will be described. As shown in FIG. 3(a), a situation in which two pieces of data each consisting of five sync blocks are entered intermittently is assumed in the following description.

The input data is converted by the serial/parallel converter 2 into eight-bit parallel data. The resultant eight-bit parallel data is put in the first pattern matching circuit 3 and the barrel shifter 4. In the barrel shifter 4, the parallel data is shifted to the normal alignment according to the offset of the synchronizing signal detected by the first pattern matching circuit 3. The normally aligned parallel data is then put in the second pattern matching circuit 5.

The second pattern matching circuit 5 detects a match between the patterns of two bytes in the synchronizing signal in the entered parallel data and supplies the first sync pulse SYNC1 of FIG. 3(b) to the state machine 8. When a state of FIG. 3(d) is the search mode (S), the second pattern match circuit resets the flywheel counter 7. Here, the flywheel counter 7 is reset in timings of the first sync pulse SYNC1 at first and sixth points shown in FIG. 3(b). When the flywheel counter is reset, the state machine 8 exits the search mode (S) and enters the verify mode (V).

The flywheel counter 7 outputs the second sync pulse SYNC2 of FIG. 3(c). When the flywheel counter 7 is reset by the output of the second pattern matching circuit 5, the second sync pulse SYNC2 thereafter matches with the first sync pulse SYNC1 in timing.

The state machine 8 performs an OR operation on the first sync pulse SYNC1 and the second sync pulse SYNC2 and outputs an operational result as a third sync pulse SYNC3. However, as shown in FIG. 3(e), the operational result is output with a delay caused by processing in the state machine 8 (in the figure, the delay is ¾ of sync block interval; actually, the delay is equivalent to several clocks).

Next, the data enable signal D-EN of FIG. 3(h) will be described. This signal is expressed in a logic relation that follows:

$$D\text{-}EN = H2 + (H1 \times V2) + (H1 \times P2)$$

where, H, V and P indicate the hold mode, the verify mode and the pre-alarm mode respectively. Numeral 1 indicates a state 1 in which, as shown in FIG. 3(f), each mode in the state shown in FIG. 3(d) is latched in a timing of the third sync pulse SYNC3. Numeral 2 indicates a state 2 in which, as shown in FIG. 3(g), the state 1 of FIG. 3(f) is delayed by one sync block.

The data enable signal D-EN indicates that the third sync pulse SYNC3 which is output from the state machine 8 in this period is valid. As seen from FIG. 3(h), the data enable signal D-EN goes high when the state machine 8 has entered the hold mode, or when one first sync pulse SYNC1 has been detected and then another first sync pulse SYNC1 has been detected in a timing matching that of the second sync pulse SYNC2. The data enable signal D-EN goes low when the state machine 8 has entered the search mode after passing through the pre-alarm mode, or when two first sync pulses SYNC1 have dropped consecutively. As shown in FIG. 3(i), output data is delayed to match the timing of the data enable signal D-EN (delaying means is not shown).

Now, referring to FIG. 4, an operation of the synchronizing signal extracting apparatus with an error involved will be described. It should be noted that those parts common with those of FIG. 3 will be omitted from the description. The description assumes that data consisting of 11 sync blocks has been entered as shown in FIG. 4(a).

As shown in FIG. 4(b), although a fifth sync pulse has not been detected, the state machine 8 is in the hold mode, so that the data enable signal is high. At an eighth sync block, the synchronizing signal has been erroneously detected. However, this erroneous detection will not be outputted as the third sync pulse SYNC3.

Figure 5:
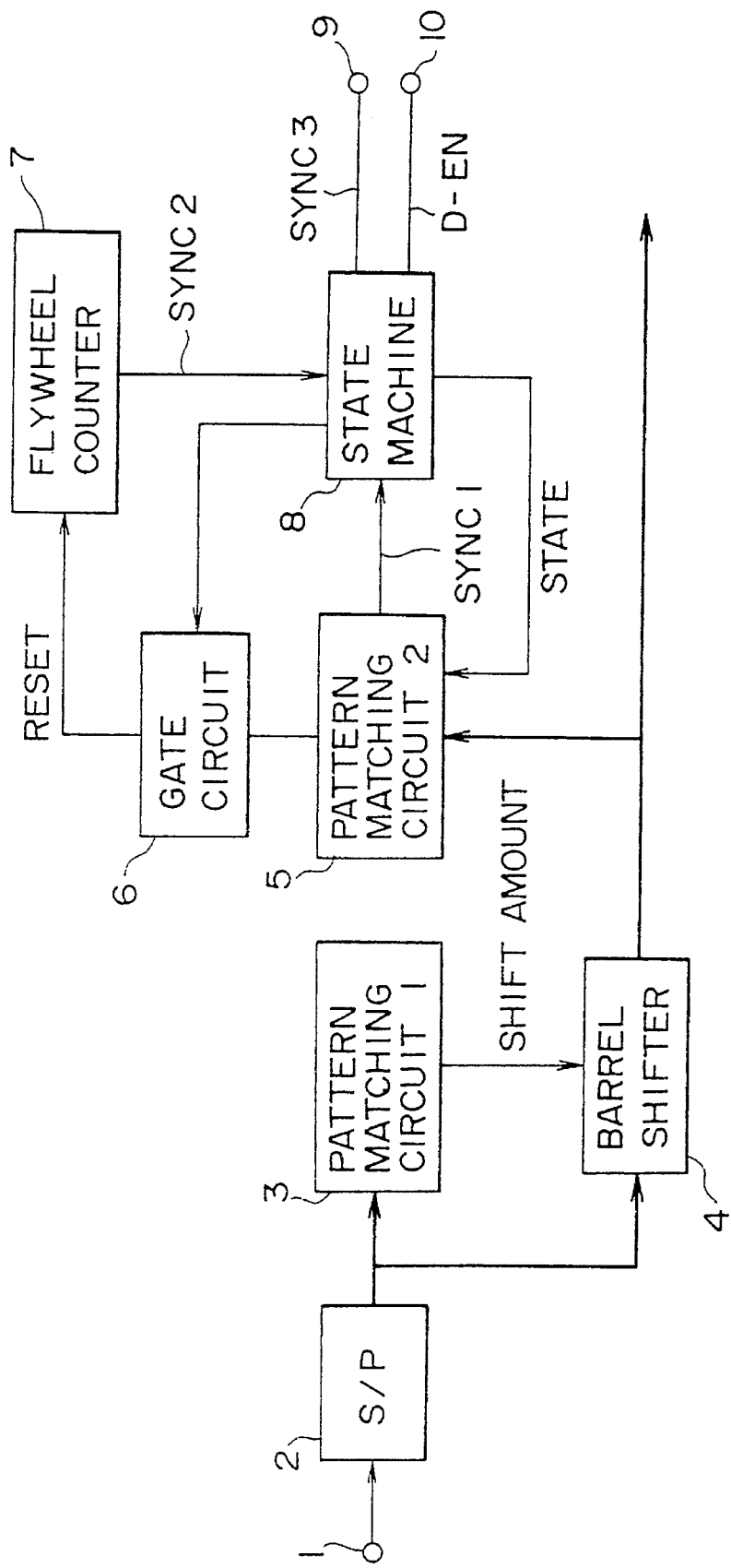
FIG. 5 is a block diagram illustrating a constitution of the synchronizing signal extracting apparatus practiced as a second embodiment of the invention.

FIG. 5 is a block diagram illustrating a constitution of the synchronizing signal extracting apparatus practiced as a second embodiment of the invention. It should be noted that those parts in FIG. 5 which are common with those in FIG. 1 are assigned with common reference numerals and are omitted from the following description.

The second embodiment is characterized by that a state of the state machine 8 is supplied to the second matching circuit 5 and the number of allowable bits is set to determine a pattern match based on the supplied state.

For example, when the state machine 8 is in the hold state, even if the two bytes or 16 bits do not all match in the second pattern matching circuit 5 and two to three bits do not match, a match is assumed and the second sync pulse SYNC2 is outputted. When the state machine 8 is in the verify or pre-alarm mode, even if one bit of the 16 bits does not match, a match may be assumed to output the second sync pulse SYNC2.

The second embodiment is effective especially when a signal-to-noise ratio of reproduced signal is poor at digital VTR variable-speed reproduction or high-speed search. That is, if the signal-to-noise ratio of reproduced signal is poor, the first embodiment may extremely degrade a frequency of occurrence of the first sync pulse SYNC1 in the second pattern matching circuit 5. Since the state machine 8 operates by comparing the first sync pulse SYNC1 with the second sync pulse SYNC2 which is outputted by the flywheel counter 7, if the first sync pulse does not come, the state machine 8 shifts to the search mode, eventually not outputting the data enable signal D-EN. On the contrary, the second embodiment is constituted such that the first sync pulse SYNC1 is generated even if an error is encountered, thereby overcoming the above-mentioned problem inherent to the first embodiment. Consequently, it is suitable to make control such that the setting of the digital VTR to variable-speed reproducing mode or high-speed search mode is detected by a microcomputer, not shown, and the state in which the state machine 8 is operating is supplied to the second pattern matching circuit 5.

It should be noted that the present invention is not by any means limited to the above-mentioned embodiments and variations to it are possible as far as they are within the spirit of the invention. For example, although, in the first and second embodiments, a synchronizing signal of one byte is detected in the first pattern matching circuit and a synchronizing signal of two bytes is detected in the second pattern matching circuit, these detecting operations may be performed only in the second pattern matching circuit.

As described and according to the invention, the novel setup outputs correct synchronizing signals and data enable signal even if the detection of synchronizing signals is missed or erroneously made, reduces chances of the missed detection of synchronizing signals even when the signal-to-noise ratio of reproduced signal is poor at digital VTR variable-speed reproduction or high-speed search, and implements synchronizing signal extraction of high precision.

While the preferred embodiments of the invention have been described using specific terms, such description is for illustrative purposes only, and it is to be understood that changes and variations may be made without departing from the spirit or scope of the appended claims.

What is claimed is:

1. A synchronizing signal detecting and error-correcting apparatus comprising:

detecting means, responsive to an input signal which is comprised of an imprecise reproduction of a substantially periodic original digital synchronization signal, said detecting means having an adjustable bit error allowance, and being operable to detect said imprecise reproduction and to produce at least one output signal;

generating means for generating a periodic output signal, the period of which depends upon said output signal from said detecting means; and error-correcting means which includes a state machine and is responsive to said detecting means and said generating means, for producing an adjustment signal to adjust said bit error allowance of said detecting means and for producing a substantially periodic corrected synchronization signal which is substantially synchronized with said original digital synchronizing signal.

2. The apparatus according to claim 1, wherein said error-correcting means produces a data enable signal which indicates the validity of said corrected synchronization signal.

3. The apparatus according to claim 1, wherein said state machine changes state depending upon whether an output signal from said detecting means and the periodic output signal from said generating means are synchronized or not synchronized with each other.

4. The apparatus according to claim 1, wherein said state machine has at least four states.

5. A synchronizing signal detecting and error-correcting apparatus comprising:

detecting means, responsive to an input signal which is comprised of an imprecise reproduction of a substantially periodic original digital synchronization signal, for detecting said imprecise reproduction and for producing at least one output signal;

generating means for generating a periodic output signal, the period of which depends upon the output signal from said detecting means; and error-correcting means, which includes a state machine, responsive to said detecting means and said generating means, for producing a substantially periodic corrected synchronization signal which is substantially synchronized with said original digital synchronizing signal and for producing a data enable signal which indicates the validity of said corrected synchronization signal.

6. The apparatus according to claim 3, wherein said detecting means has an adjustable bit error allowance and said error-correcting means produces an adjustment signal to adjust said bit error allowance of said detecting means.

7. The apparatus according to claim 5, wherein said state machine changes state depending upon whether an output signal from said detecting means and the periodic output signal from said generating means are synchronized or not synchronized with each other.

8. The apparatus according to claim 5, wherein said state machine has at least four states.

* * * * *